Patented Nov. 7, 1933

1,933,975

UNITED STATES PATENT OFFICE 1,933,975

PROCESS OF PREPARING ACYLATED PHENOLS

Herbert L. J. Haller and Paul S. Schaffer, Washington, D. C., dedicated to the free use of the Public No Drawing. Application May 29, 1933
Serial No. 673,501

6 Claims. (Cl. 260—107)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to us of any royalty thereon.

We hereby dedicate the invention herein described to the free use of the public in the territory of the United States of America to take effect upon the granting of a patent to us.

This invention relates to a process of preparing acylated phenols and acylated substituted phenols by treatment of diazoniumborofluorides with acid anhydrides or the corresponding acids.

Acylated phenols or substituted phenols are in most instances prepared from the corresponding phenol by the use of an acylating agent. In some cases, however, acetates of phenols are prepared by the interaction of acetic acid with the diazo halides (Meldola and East, Trans. Chem. Soc. 53: 460, 1888; Orndorff, Am. Chem. J. 10: 368, 1888) or by the action of acetic anhydrides on the diazo halides (Wallach, Ann. 235: 249, 1886). As a general rule the yield of the acetates by these methods is not high. Furthermore, the diazo halides when dry are explosive and are therefore difficult to prepare.

We have found that when diazonium borofluorides, which are non-explosive when dry and which are readily obtained in good yields from a diazonium chloride and hydrofluoroboric acid (Balz and Schiemann, Ber. 60: 1187, 1927) are treated with acetic anhydride or acetic acid, nitrogen is given off and a product is formed which is probably a coordination compound of boron fluoride and the acetate of a phenol. When this product is heated in water or in dilute alcohol the acetate of the phenol is obtained. The acetate of the phenol can be readily hydrolyzed to the phenol so that this method is useful in effecting the replacement of the diazo group by the hydroxy group in such cases where the normal decomposition with water does not take place.

By the use of propionic anhydride or propionic acid, butyric anhydride or butyric acid, etc., propionates, butyrates, etc., of the phenols are obtained. Among examples of compounds prepared according to the process of our invention we may mention phenylacetate, m-bromophenyl acetate and d-naphthylacetate. However, the invention is not limited to these compounds but is applicable for preparing a wide range of products.

The process is illustrated by the following examples:

*Example 1.*—Fifteen grams p-aminoacetanilide are dissolved in 21 cc. hydrochloric acid (sp. gr. 1.19) and 35 cc. water and this solution is diazotized in the usual manner by adding a 25 per cent aqueous solution of sodium nitrite at a temperature below 5° C. until a very slight excess of nitrous acid is shown by the starch-iodide test. On addition of 35 cc. of 40 per cent hydrofluoroboric acid to the diazotized solution, p-acetaminophenyl diazonium borofluoride is precipitated. After standing in an ice-water bath for a short time the salt is filtered off and carefully washed successively with 40 per cent hydrofluoroboric acid, alcohol and ether. The yield of dry product is 20 gms. The product is recrystallized from acetone and chloroform. It melts at 137° C. with decomposition. Five gms. of p-acetaminophenyl diazonium borofluoride in 25 cc. acetic anhydride are heated under a reflux condenser until nitrogen is no longer evolved. The solution is cooled and the product which has settled out is filtered off. It is probably a coordination compound of boron trifluoride and diacetyl p-aminophenol. On crystallization from dilute alcohol a product which melts at 152° C. is obtained. The yield is 3 gms. It was identified as p-acetaminophenylacetate.

*Example 2.*—Twenty grams of m-chlorophenyl diazonium borofluoride, prepared from m-chlorophenyl diazonium chloride and hydroborofluoric acid in the usual manner are heated under reflux with 100 cc. of acetic acid until gas is no longer evolved. The solution is cooled and then concentrated under reduced pressure to a small volume. The concentrated solution is poured into 200 cc. of water at 40 to 60° C. The oil which separates is removed, and the aqueous solution is neutralized with sodium carbonate and then extracted with ether. The oil and ether extracts are combined, washed with water and dried over sodium sulfate. The ether is removed and the remaining m-chlorophenylacetate is distilled. It boils at 108° C. at a pressure of 12 mm. The yield is 7.0 gms.

*Example 3.*—Ten grams of p-methylphenyldiazoniumborofluoride, prepared from p-methylphenyldiazonium chloride and hydrofluoroboric acid by the usual procedure are heated with 100 cc. glacial acetic acid under a reflux condenser until nitrogen is no longer given off. The solution is then concentrated under reduced pressure to a small volume. The remaining liquid is poured into 100 cc. of ice water and the solution is neutralized with sodium carbonate. The oil which separates is removed and the aqueous solution is extracted with ether. The oil and the ether extracts are combined, washed with water and dried over sodium sulfate. The ether is removed and the p-methylphenylacetate is distilled. It boils at 94° C. at a pressure of 10 mm. Yield 4.5 grams.

The method is applicable to the preparation of propionates, butyrates, etc., of phenols or substituted phenols by the use of the corresponding acid anhydrides or acids. For example p-methylphenylpropionate may be made as follows:

*Example 4.*—Ten gms. p-methylphenyldiazoniumborofluoride are added to 50 cc. propionic acid and gently heated until nitrogen begins to be evolved. When the reaction is over the solution is concentrated under reduced pressure to a small volume. The concentrated solution is poured into ice water and neutralized with sodium carbonate. The separated oil is extracted with ether and the ether extracts are washed first with cold 2.5 per cent sodium hydroxide, then with water. The ether extract is dried, the ether is removed and the remaining p-methylphenylpropionate is distilled. It boils 69–72° C. at a pressure less than 1 mm. The yield is 3.0 gms.

Having thus described our invention, we claim:

1. The process of preparing an acylated phenol which comprises heating an aryl diazonium borofluoride with a lower fatty acid.

2. The process of preparing an acylated phenol which comprises heating an aryl diazonium borofluoride with a lower fatty acid anhydride.

3. The process of preparing an acylated phenol which comprises heating an aryl diazonium borofluoride with a fatty acid of the formula $C_nH_{2n}O_2$.

4. The process of preparing an acylated phenol which comprises heating an aryl diazonium borofluoride with a fatty acid anhydride of the formula $C_nH_{n+2}O_3$.

5. The herein described process of preparing an acetate of a phenol which comprises diazotizing an aromatic amine, forming a diazonium borofluoride therefrom and heating the diazonium borofluoride with acetic acid.

6. The herein described process of preparing an acetate of a phenol which comprises diazotizing an aromatic amine, forming a diazonium borofluoride therefrom and heating the diazonium borofluoride with acetic anhydride.

HERBERT L. J. HALLER.
PAUL S. SCHAFFER.